Figure 1:
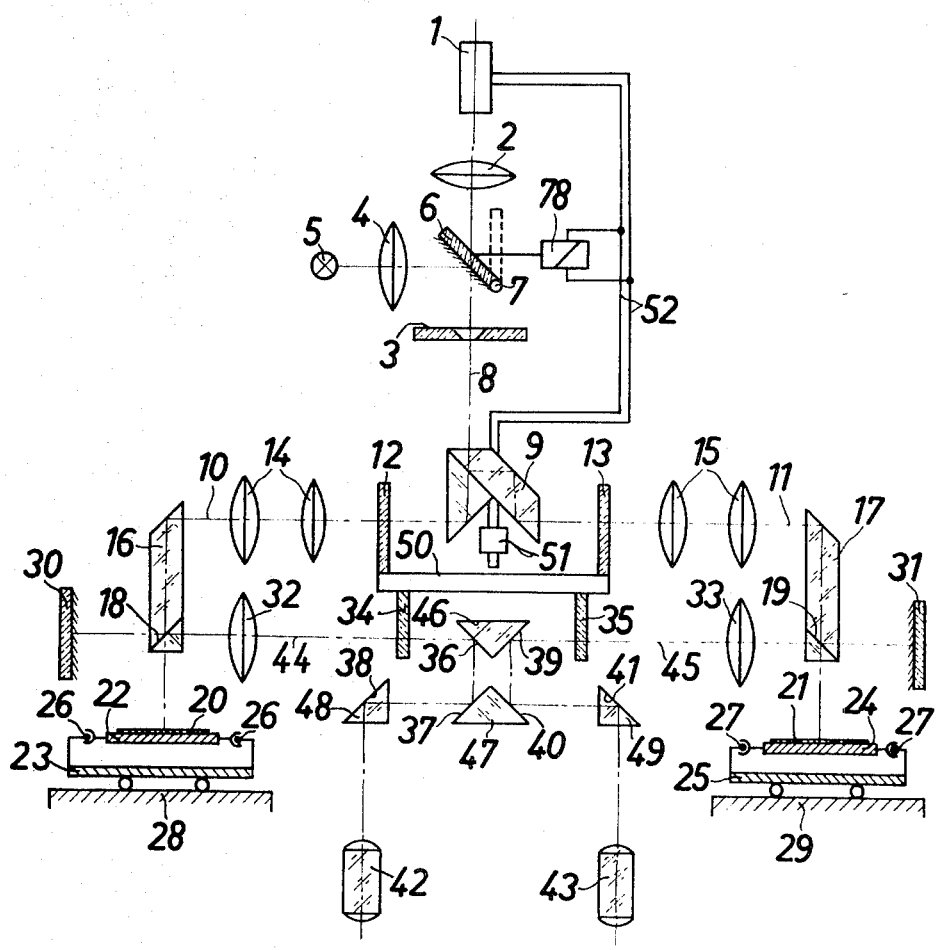

United States Patent

[11] 3,591,251

| [72] | Inventor | Peter Blankenburg<br>Dresden, Germany |
|---|---|---|
| [21] | Appl. No. | 820,679 |
| [22] | Filed | Apr. 30, 1969 |
| [45] | Patented | July 6, 1971 |
| [73] | Assignee | VEB Carl Zeiss Jena<br>Jena, Gera, Germany |

[54] DIAPHRAGM EQUIPMENT IN OPTICAL INSTRUMENTS
1 Claim, 4 Drawing Figs.

[52] U.S. Cl. ................................................. 350/17,
350/10, 350/36, 350/137
[51] Int. Cl. .................................................. G02b 27/22
[50] Field of Search ........................................ 350/30, 34,
35, 138, 10, 36, 137; 356/2; 331/94,5

[56] References Cited
UNITED STATES PATENTS

| 2,960,006 | 11/1960 | Bartorelli | 350/34 X |
| 3,418,034 | 12/1968 | Ambrose | 350/34 X |

FOREIGN PATENTS

| 642,492 | 2/1937 | Germany | 356/2 |
| 1,431,537 | 1/1966 | France | 350/34 |
| 1,463,509 | 11/1966 | France | 350/34 |

*Primary Examiner*—David H. Rubin

ABSTRACT: An optical instrument, particularly for stereoscopical point marking, comprises an optical system for directing the point-marking radiation from at least one radiation source to at least two objects which it is desired to mark with homologous points, and an optical system for the stereoscopic observation of the objects and the adjustment of the homologous points. Both systems have optical elements in common, at least near the objects. A diaphragm system which can be interposed in the stereoscopical observation ray-path prevents marking radiation from entering the observer's eye. Each marking ray-path includes also a diaphragm which, when considered necessary, can be so coupled to said diaphragm system as to mask one of the two marking ray-paths.

DIAPHRAGM EQUIPMENT IN OPTICAL INSTRUMENTS

This invention is concerned with a diaphragm equipment for optical instruments which is made up of four diaphragms that can each be interposed in one of four ray-paths.

Stereophotogrammetric instruments for the marking of points comprise an observation and measuring system for identifying and adjusting each of a plurality of points and a system for marking these points in a pair of photograms. The accuracy of the marking depends mainly on exact coincidence of adjusted point and marked point. To ensure accuracy, clearness and usefulness of the marked points, energy-rich optical radiation is employed for marking, and the two systems operate as far as possible with optical elements which they have in common. An equipment of this kind has the disadvantage that it is easy for the energy-rich radiation to penetrate into the observation system and injure the observer's eyes. Moreover, it is desirable that the points can be marked at discretion either in only one photogram or in both photograms.

The present invention aims at improving optical instruments of the foregoing kind by providing therein a diaphragm equipment in which one single means permits masking at most three of the four ray-paths, two of the masked ray-paths being always similar to one another.

To this end the present invention consists in a diaphragm equipment for optical instruments including four ray-paths, wherein the two diaphragms for insertion in the two similar ray-paths are rigidly interconnected and can each be coupled to one of the two diaphragms that permit to be inserted independently of each other in the other two ray-paths. The coupling of the diaphragms may be mechanical, electromechanical or electrical. Advantageously, the rigidly interconnected diaphragms are rotatable independently of the other two diaphragms, so that two ray-paths can be masked without interference with the others. Thus it is possible to intercept the observation paths during the process of marking. A simple diaphragm equipment is obtained by providing that the diaphragms rotate about a common axis. If the pivoting of the diaphragms into and out of the ray-paths is desired to be combined with another operation, it is advantageous to provide a switch which operates when the two interconnected diaphragms have pivoted into their respective ray-paths. For example, the marking could take place in a photogrammetric point-marking apparatus when the diaphragms have reached their extreme positions. The invention is of course not restricted to the use in an instrument for the marking of points, but is applicable wherever at least two ray-paths are required to be influenced by diaphragms simultaneously.

Figure 4:
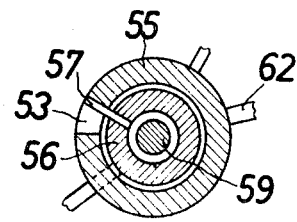
Figure 2:
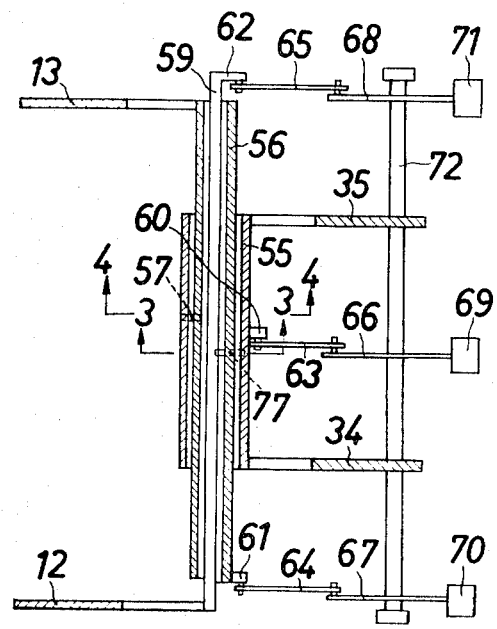
Figure 3:
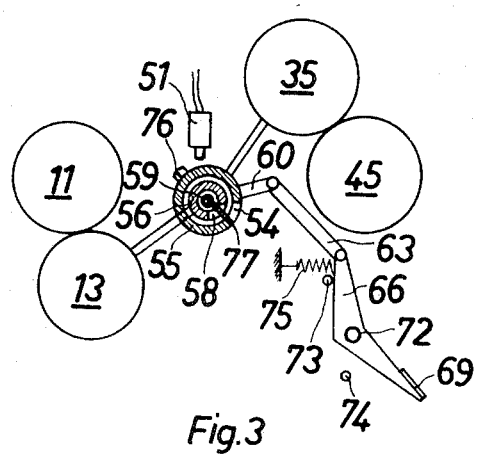

In order that the invention may be more readily understood, reference is made to the accompanying drawings which illustrate diagrammatically and by way of example one embodiment thereof, and in which:

FIG. 1 is a diagram of the essential optical elements of an instrument in which the present invention is used, FIG. 2 illustrates one possibility of arranging the diaphragms, and FIGS. 3 and 4 are respectively a section taken on the line 3-3 and a section of the line 4-4 of FIG. 2.

In FIG. 1 of the drawings, the aperture of a radiation source 1 lies in the object plane of an objective 2 the image plane of which contains a perforated diaphragm 3. The diaphragm 3 lies also in the image plane of a condenser 4 which has a light source 5 in its object plane. A mirror 6 located between the objective 2, the condenser 4 and the diaphragm 3 is rotatable by means of an electric motor 78 about an axle 7 at right angles to the plane of the drawing. A beam-splitting prism 9 the principal-section plane of which is parallel to the plane of the drawing, lies in the rear of the diaphragm 3 in a beam 8 represented in the drawing by its axial ray. The prism 9 splits the beam 8 into two partial beams 10 and 11. The partial beam 10 includes a diaphragm 12, imaging lenses 14, a prism 16 having a ray-splitting face 18, and a radiation-sensitive carrier (object) 20 on cross-slides 22, 23. The partial beam 11 includes a diaphragm 13, imaging lenses 15, a prism 17 having a ray-splitting face 19, and a radiation-sensitive carrier (object) 21 on cross-slides 24, 25. The slides 22 and 24 are at right angles to the plane of the drawing and respectively displaceable along guides 26 and 27. The slides 23 and 25 are parallel to the plane of the drawing and respectively displaceable along guides 28 and 29.

An optical system for guiding a beam 44 comprises a reflector 30, an objective 32, a diaphragm 34, three deviating faces 36, 37, 38, and an eyepiece 42. An optical system for guiding a beam 45 comprises a reflector 31, an objective 33, a diaphragm 35, three deviating faces 39, 40, 41, and an eyepiece 43. These two optical systems are so arranged that the ray-splitting face 18 lies in the beam 44, and the ray-splitting face 19 in the beam 45. The deviating faces 36, 37 and 38 form part of, respectively, prisms 46, 47 and 48. The deviating faces 39, 40 and 41 form part of, respectively, the prism 46, the prism 47 and a prism 49.

The diaphragms 12, 13, 34, 35 are rotatable in a manner described hereinafter about a common axle 50 in planes at right angles to the partial beams 10, 11 and the beams 44, 45. A switch 51 which is located near the axle 50, and the radiation source 1 lies in an electric circuit 52.

In FIG. 1, the condenser 4 and the mirror 6 direct the beam from the light source 5 through the perforated diaphragm 3, which serves as collimating mark, to the prism 9, where the beam is split into the two partial beams 10 and 11. The imaging lenses 14, the prism 16 and the ray-splitting face 18 image the diaphragm 3 on the radiation-sensitive carrier 20 and on the reflector 30. The imaging lenses 15, the prism 17 and the ray-splitting face 19 image the diaphragm 3 on the radiation-sensitive carrier 21 and on the reflector 31. The image in the plane of the reflector 30 can be seen through the objective 32 and the eyepiece 42, and the image in the plane of the reflector 31 through the objective 33 and the eyepiece 43. When the images of the diaphragm 3 and the carriers 20 and 21 are being viewed, the diaphragms 12, 13, 34, 35 lie outside the beams 10, 11, 44, 45.

Rotation of the mirror 6 into the broken line position illustrated in FIG. 1, causes the rays from the radiation source 1 and the diaphragm 3 to be combined by the lenses 14 in the plane of the carrier 20 and in that of the reflector 30, and by the lenses 15 in the plane of the carrier 21 and in that of the reflector 31. While it is important for the observation that the images of the diaphragm 3 on the reflectors 30 and 31 be clearly visible in the observation systems, it is equally important for the marking that a sufficient amount of radiation proceeding from the radiation source 1 and depending on the perforation of the diaphragm 3 strike the carriers 20 and 21, but not the observer's eyes. Therefore, when markings are desired to be made, the diaphragms 34 and 35 are respectively tilted into the ray-paths 44 and 45, and only then is the radiation source 1 connected by the switch 51 to the circuit 52. The masking of one of the two partial beams 10 and 11 and, accordingly, the marking of only one of the carriers 20 and 21, is effected by the diaphragms 12 and 13.

The construction of the axle 50 as well as the arrangement and interconnection of the diaphragms 12, 13, 34, 35 are illustrated in more detail in FIGS. 2 to 4, in which a hollow shaft 55 has two definitely sized clearings 53 and 54 and a cam 76 and carries the diaphragms 34 and 35. The hollow shaft 55 includes a coaxial hollow shaft 56 carrying the diaphragm 13 and a tappet 57 which operatively engages the clearance 53. The hollow shaft 56 has a clearance 58 through which a tappet 77 attached to a control shaft 59 extends operatively into the clearance 54 of the hollow shaft 55. The shaft 59 carries the diaphragm 12 and is coaxial with the hollow shafts 55 and 56.

Cranks 60, 61 and 62 respectively attached to the shafts 55, 56 and 59 are connected by links 63, 64 and 65 to levers 66, 67 and 68 of keys 69, 70 and 71. The levers 66, 67, 68 are fulcrumed on a common axle 72, the rotation of each being limited by two stationary stops. Only the stops 73 and 74 of the lever 66 are illustrated in FIG. 3. Each lever is pulled against one of its stops by means of a spring. In FIG. 3, a spring 75 urges the lever 66 against the stop 73.

At the outset, when none of the diaphragms 12, 13, 34 and 35 occupies the ray-paths 10, 11, 44, and 45, an observation is made of the radiation-sensitive carriers 20 and 21 and the images of the perforated diaphragm 3. If markings are desired on both carriers (photograms) 20 and 21, the key 69 is pressed by hand so that the lever 66 contacts the stop 74. In consequence thereof, the link 63 and the crank 60 rotate the hollow shaft 55 an amount corresponding approximately to the peripheral breadth of the clearances 53 and 54, and the cam 76 contacts the switch 51, which causes the mirror 6 to tilt into the broken line position illustrated in FIG. 1, and the radiation source to operate. Rotation of the hollow shaft 55 introduces the diaphragms 34 and 35 into the ray-paths 44 and 45, which are thus completely interrupted. Release of the pressure on the key 69 causes the hollow shaft 55 to return the diaphragms 34 and 35 to their original positions shown in FIG. 3.

Markings on the carrier 20 are obtained by pressure on the key 70, and markings on the carrier 21 by pressure on the key 71. Pressure on the key 70 causes the lever 67, the link 64 and the crank 61 to rotate the shaft 56 through an angle equal to that described with reference to the hollow shaft 55. The rotation of the shaft 56 continuously urges the tappet 57 into contact with that edge of the clearance 53 which lies in the direction of rotation. Accordingly, rotation of the shaft 56 takes the shaft 55 along by the same amount, and the diaphragm 13 as well as the diaphragms 34 and 35 are displaced to intercept the ray-paths 11, 44, 45 completely. The radiation from source 1, released by the cam 76 and the switch 51, is consequently directed to the radiation-sensitive carrier 20 only. When the key 70 is relieved, the spring (not shown) retracts the lever 67, so that the original positions of the shafts 56 and 55 are restored.

For the radiation to be directed to the radiation-sensitive carrier 21 only, the key 71 is pressed, whereupon the lever 68, the link 65 and the crank 62 cause the shaft 59 carrying the diaphragm 12 to rotate through the above-mentioned angle. Owing to continuous contact of the tappet 77 in the clearance 54, the shaft 55 is rotated by the same amount. No rotation is however imparted to the shaft 56, because the clearance 58 is wider than the range of the freedom of the tappet 77 in this clearance. Rotation of the shafts 59 and 55 introduces the diaphragms 12, 34 and 35 into, respectively, the ray-paths 10, 44 and 45, so that only the ray-path 11 remains unmasked. Simultaneously, the rotation of the shaft 55 causes the cam 76 to contact the switch 51 at the instant at which only the ray-path 11 is unmasked and the radiation from the source 1 can impinge on the carrier 21, provided of course that the mirror 6 assumes the broken line position illustrated in FIG. 1. The diaphragms 12, 34, 35 and the cam 76 reassume their original positions as soon as the key 71 is released.

The embodiment of the invention particularly described is presented merely as an example of how the invention may be applied, other embodiments, forms and applications of the invention coming within the proper scope of the appended claims will of course readily suggest themselves to those skilled in the art. Variations are possible particularly in the ray-paths. For example, if the partial ray-paths 10 and 11 are at right angles to the ray-paths 44 and 45 and the diaphragms are in the form of sheets, the planes of the diaphragms 12 and 13 can be at right angles to those of the diaphragms 34 and 35. Moreover, each of the carriers 20 and 21 may have its own light source and/or its own radiation source. The diaphragms need not be rotatable about an axle, but can be coupled directly to one another by suitable mechanical, electrical or electromechanical means. It would also be feasible to mount the diaphragms in guides for linear displacement transverse to the ray-paths. Instead of simple diaphragms, use could be made of photographic shutters suitably coupled and synchronized.

I claim:

1. A diaphragm equipment in optical instruments which comprise
   a pair of objects,
   at least one source of radiation optically aligned with said pair of objects,
   two imaging systems respectively aligned with said objects for respectively producing two beams of illumination rays from said source of radiation to said objects,
   an observation system consisting of two objectives and two eyepieces for producing a beam of observation rays from the one object and a beam of observation rays from the other,
   said objects being respectively in optical alignment with said two illumination beams and being respectively in optical alignment with said two observation beams, the illumination beam and the observation beam of said one object being substantially at right angles to and coinciding at least near said one object, the illumination beam and the observation beam of said other object being substantially at right angles to and coinciding at least near said other object, the radiation of each of said illumination beams being reflected by the respective said object into the observation beam thereof,
   said diaphragm equipment including four diaphragms each of which is insertable into one of said beams for masking same,
   each of said diaphragms being displaceable transversely to that of said beams into which it is insertable,
   an exterior hollow shaft,
   said two diaphragms insertable in said observation beams being attached to said exterior hollow shaft,
   an interior hollow shaft,
   said exterior hollow shaft being rotatably mounted on said interior hollow shaft, one of said two diaphragms insertable in said observation beams being rigidly connected to said interior hollow shaft,
   a control shaft,
   said interior hollow shaft being rotatably mounted on said control shaft, said control shaft being coaxial with said hollow shafts, the other of said two diaphragms insertable in said observation beams being rigidly connected to said control shaft,
   a first lever mechanism pivoting about an axle and linked to said exterior hollow shaft for transverse displacement of said diaphragm insertable in said observation beams, a second lever mechanism pivoting about an axle and to which said interior hollow shaft is linked for transverse displacement of the one of said diaphragms insertable in said illumination beams, a third lever mechanism pivoting about an axle and to which said control shaft is linked for transverse displacement of the other of said diaphragms insertable in said illumination beams, and two tappets for selective transmission of the transverse displacement of said one diaphragm and the transverse displacement of said other diaphragm to both said diaphragms,
   one of said tappets being rigidly connected to said control shaft and extending into respective apertures in said hollow shafts, and the other of said tappets being rigidly connected to said interior hollow shaft and extending into an aperture in said exterior hollow shaft, the peripheral width of said apertures corresponding substantially to the field of traverse of said shafts.